(12) United States Patent
Chen et al.

(10) Patent No.: US 11,176,439 B2
(45) Date of Patent: Nov. 16, 2021

(54) CONVOLUTIONAL NEURAL NETWORK WITH SPARSE AND COMPLEMENTARY KERNELS

(71) Applicant: International Business Machines Corporation, Armonk, NY (US)

(72) Inventors: Richard Chen, Mount Kisco, NY (US); Quanfu Fan, Lexington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 990 days.

(21) Appl. No.: 15/829,031

(22) Filed: Dec. 1, 2017

(65) Prior Publication Data

US 2019/0171926 A1 Jun. 6, 2019

(51) Int. Cl.
*G06N 3/04* (2006.01)

(52) U.S. Cl.
CPC ...................................... *G06N 3/04* (2013.01)

(58) Field of Classification Search
CPC .. B29C 66/965; B60T 2210/122; B25J 9/161; G05B 2219/25255; G06N 3/02
See application file for complete search history.

(56) References Cited

U.S. PATENT DOCUMENTS

| 9,536,293 | B2 | 1/2017 | Lin et al. |
| 2016/0174902 | A1 | 6/2016 | Georgescu et al. |

FOREIGN PATENT DOCUMENTS

CN 105139028 A 12/2015

OTHER PUBLICATIONS

Baoyuan Liu, Min Wang, Hassan Foroosh, Marshall Tappen, & Marianna Penksy. Sparse Convolutional Neural Networks. Jun. 2015. IEEE (Year: 2015).*
Angshuman Parashar, Minsoo Rhu, Anurag Mukkara, Antonio Puglielli, Rangharajan Venkatesan, Brucek Khailany, Joel Emer, Stephen W. Keckler, & William J. Dally. SCNN: An Accelerator for Compressed-sparse Convolutional Neural Networks. Jun. 2017. ISCA (Year: 2017).*

(Continued)

*Primary Examiner* — Michael J Huntley
*Assistant Examiner* — Qamar Iqbal
(74) *Attorney, Agent, or Firm* — Amin, Turocy & Watson, LLP

(57) ABSTRACT

Technologies for providing convolutional neural networks are described. An analysis component determines an initial convolutional layer in a network architecture of a convolutional neural network and one or more subsequent convolutional layers in the network architecture. A replacement component replaces original convolutional kernels in the initial convolutional layer with initial sparse convolutional kernels, and replaces subsequent convolutional kernels in one or more subsequent convolutional layers with complementary sparse convolutional kernels. The complementary sparse kernels have a complementary pattern with respect to sparse kernels of a previous convolutional layer. Analyzing the network architecture and a trained model of a convolutional neural network can determine the original convolutional kernels and replace those kernels with sparse kernels based on similarity and/or weight in an initial layer, with sparse complementary kernels used in subsequent layers.

20 Claims, 18 Drawing Sheets

(56) References Cited

OTHER PUBLICATIONS

Yani Ioannou, Duncan Robertson, Jamie Shotton, Roberto Cipolla & Antonio Criminisi. Training CNNS With Low-Rank Filters for Efficient Image Classification. 2016. ICLR. (Year: 2016).*

Changpinyo, et al., "The Power of Sparsity in Convolutional Neural Networks," arXiv:1702.06257v1 [cs.CV] Feb. 21, 2017, 13 pages.

Kim, et al., "Compression of Deep Convolutional Neural Networks for Fast and Low Power Mobile Applications," arXiv:1511.06530v2 [cs.CV] Feb. 24, 2016, 16 pages.

Han, et al., "Deep Compression: Compressing Deep Neural Networks With Pruning, Trained Quantization and Huffman Coding," arXiv:1510.00149v5 [cs.CV] Feb. 15, 2016, 14 pages.

Chen, et al., "DeepLab: Semantic Image Segmentation with Deep Convolutional Nets, Atrous Convolution, and Fully Connected CRFs," perforarXiv: 606.00915v2 [cs.CV] May 12, 2017, 14 pages.

Sun, et al., "Design of Kernels in Convolutional Neural Networks for Image Classification," arXiv:1511.09231v3 [cs.CV] Nov. 29, 2016, 20 pages.

Anonymous, "Machine Learning Algorithms for Smart Meter Diagnostics," Publication Date: Jul. 16, 2015, 53 pages.

Anonymous, "Retinal Image Quality Classification Using Convolutional Neural Networks," Publication Date: Mar. 21, 2016, 5 pages.

Anonymous, "Methods for Deep Learning Network Compression for Resource-constrained Devices," Publication Date: Jun. 21, 2016, 5 pages.

Figurnov, et al., "PerforatedCNNs: Acceleration through Elimination of Redundant Convolutions," arXiv:1504.08362v4 [cs.CV] Oct. 16, 2016, 12 pages.

Jaderberg, et al., "Speeding up Convolutional Neural Networks with Low Rank Expansions," arXiv:1405.3866v1 [cs.CV] May 15, 2014, 12 pages.

Ioannou, et al., "Training CNNS With Low-Rank Filters for Efficient Image Classification," arXiv:1511.06744v3 [cs.CV] Feb. 7, 2016, 17 pages.

Fan, et al., "A Sparse Deep Feature Representation for Object Detection from Wearable Cameras," 2017, 12 pages.

* cited by examiner

CONVOLUTIONAL NEURAL NETWORK WITH SPARSE AND COMPLEMENTARY KERNELS

TECHNICAL FIELD

The subject disclosure relates to convolutional neural networks, and more specifically, to using sparse and complementary convolutional kernels to reduce computing resource consumption with respect to convolutional neural network processing.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating providing efficient convolution neural networks are described.

According to an embodiment, a system can comprise a memory that stores computer executable components and a processor that executes computer executable components stored in the memory. The computer executable components can comprise an analysis component that analyzes an initial convolutional layer in a network architecture of a convolutional neural network and one or more subsequent convolutional layers in the network architecture. The computer executable components can further comprise a replacement component that replaces original convolutional kernels in the initial convolutional layer with initial sparse convolutional kernels, and replaces subsequent convolutional kernels in one or more subsequent convolutional layers with complementary sparse convolutional kernels, wherein the complementary sparse convolutional kernels have a complementary pattern with respect to sparse kernels of a previous convolutional layer.

According to another embodiment, a computer-implemented method is provided. The computer-implemented method can comprise analyzing, by a system operatively coupled to a processor, an initial convolutional layer in a network architecture of a convolutional neural network and one or more subsequent convolutional layers in the network architecture. The computer implemented method can further comprise replacing, by the system, original convolutional kernels in the initial convolutional layer with initial sparse convolutional kernels, and replacing, by the system, subsequent convolutional kernels in one or more subsequent convolutional layers with complementary sparse convolutional kernels, wherein the complementary sparse convolutional kernels have a complementary pattern with respect to sparse kernels of a previous convolutional layer.

According to yet another embodiment, a computer program product facilitating providing efficient convolution neural networks can be provided, the computer program product comprising a computer readable storage medium having program instructions embodied therewith, the program instructions executable by a processor to cause the processor to analyze a network architecture and a trained model of a convolutional neural network to determine original convolutional kernels in an initial convolutional layer and determine one or more subsequent convolutional layers in the network architecture. The program instructions can be further executable to replace the original convolutional kernels in the initial convolutional layer with initial sparse convolutional kernels, and replace subsequent convolutional kernels in one or more subsequent convolutional layers with complementary sparse convolutional kernels, wherein the complementary sparse convolutional kernels have a complementary pattern with respect to sparse kernels of a previous convolutional layer.

DESCRIPTION OF THE DRAWINGS

FIGS. 4A-7B illustrate non-limiting example 3×3 sparse kernels that may be used in convolution layers of a convolutional neural network in accordance with one or more embodiments described herein.

FIGS. 7C-10C illustrate non-limiting example 5×5 sparse kernels that may be used in convolution layers of a convolutional neural network in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
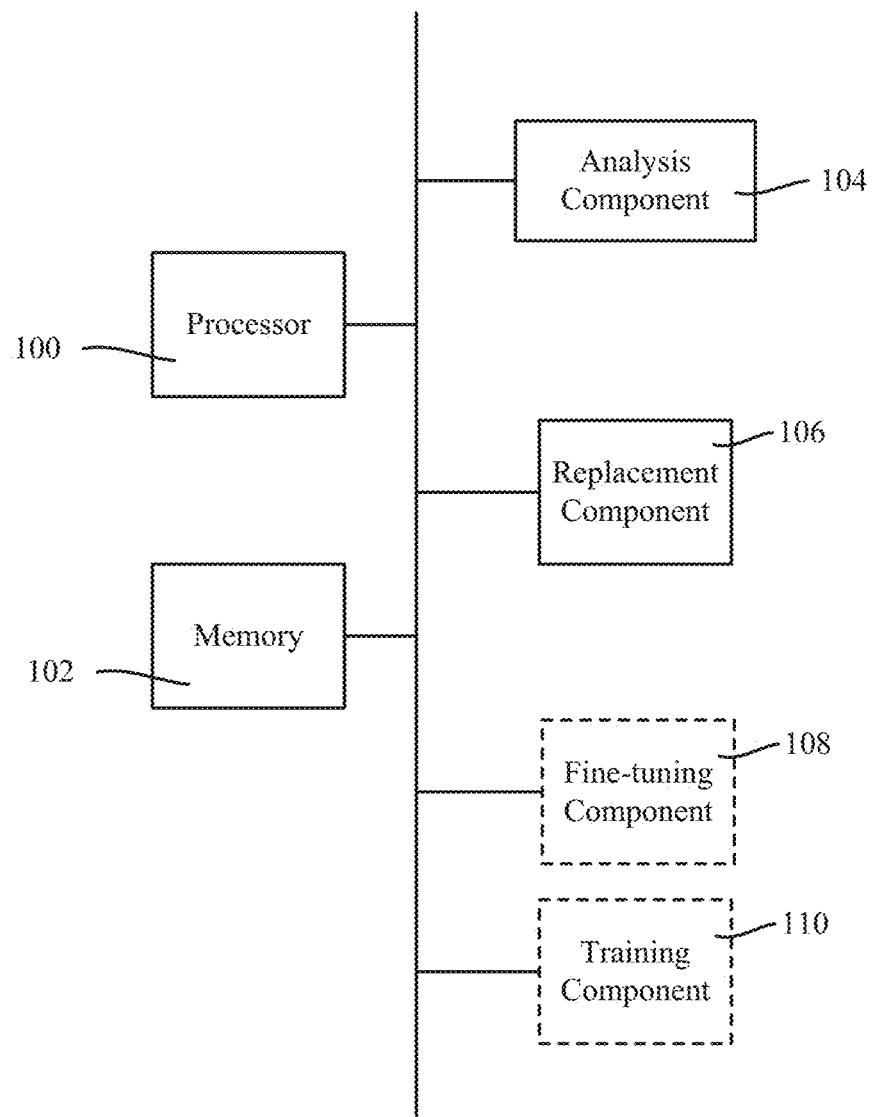
FIG. 1 is a block diagram of an example, non-limiting system that illustrates various aspects of the technology in accordance with one or more embodiments described herein.

FIG. 1 illustrates an example of a processor 100 and memory 102 coupled to components of a system directed towards selecting sparse and complementary convolutional kernels for a convolutional neural network. As can be seen, an analysis component 104 is provided, which as described herein, analyzes a network architecture and (e.g., pre-trained) network model of a convolutional neural network. As will be understood, the analysis component looks for kernel patterns within the pre-trained model, such as based on pattern weights.

FIG. 1 further illustrates a replacement component 106, which in general replaces original kernels with sparse kernels and complementary kernels, based on the most represented sparse patterns (as determined by the analysis component 104). For example, the analysis component 104 can determine the sparse kernels based on a similarity measure with respect to a most similar sparse pattern inherited from pre-trained weights relative to the original kernels, and the replacement component 106 can use the most similar sparse kernels to replace the original kernels in the initial convolutional layer.

Those patterns are then applied on the network, e.g., by a fine-tuning component 108 or re-training from scratch by a training component 110. Note that in FIG. 1, the fine-tuning component 108 as well as the training component 110 are shown as dashed boxes, as for example, such components may not be directly coupled to the processor 100 and memory 102, and instead may be external components that operate on the output of the replacement component 106, generally comprising the convolutional layers after replacement with sparse kernels.

Figure 2:
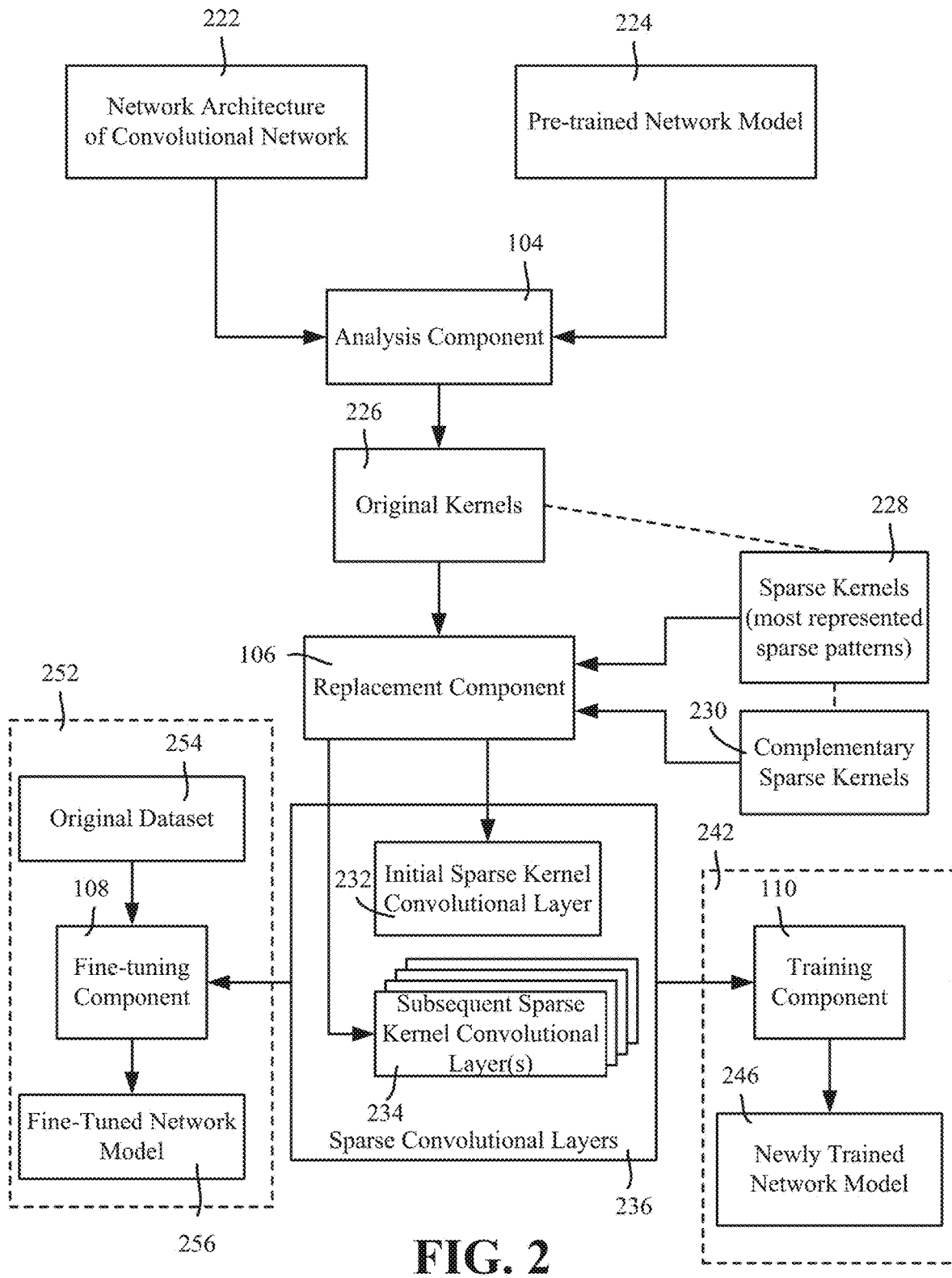
FIG. 2 illustrates a diagram representing example components corresponding to the various technical aspects of FIG. 1 comprising various components that use sparse and complementary convolutional kernels in accordance with one or more embodiments described herein.

FIG. 2 exemplifies additional details with respect to the structure and operations of the components of FIG. 1. In FIG. 2, the analysis component 104 receives information corresponding to the network architecture of the convolutional network 222 (e.g., such as how many layers are present) and a pre-trained network model 224. The analysis component evaluates the original kernels 226 and determines the sparse kernels 228 (e.g. the most represented sparse patterns). For example, the analysis component 104 can perform clustering of the kernels based on their weights, that is, by analyzing and determining the potential sparse kernels based on pre-trained weights.

The replacement component 106 replaces the original kernels 226 with the most similar sparse kernels 228, which provides the initial convolutional layer 232. Thereafter, the replacement component typically uses the complementary sparse kernels 230 to obtain the kernels for subsequent convolutional layers 234. Note that in subsequent convolutional layers 234 the replacement component 106 can replace the kernels by other sparse kernels that own the complementary pattern with respect to the previous convolutional layer, or the most similar sparse pattern (e.g., inherited from its pre-trained weights).

Once the sparse convolutional layers (represented in FIG. 2 by block 236) are obtained following replacement, fine-tuning or re-training (from the beginning, that is "from scratch") may be performed. This is represented in FIG. 2 via block 242, in which a training component uses the sparse convolutional layers (block 236) to provide a newly trained network model 246. Alternatively, or in addition to re-training, as represented in FIG. 2 via block 252, the fine-tuning component 108 can produce a fine-tuned network model 256 based on the original dataset 254.

Note that typically there are thousands of convolutional kernels in a deep convolutional neural network, causing heavy computational load and large memory space for intermediate data. In general, a deep convolutional neural network has a significant number of redundant parameters.

The technology described herein designs sparse kernels for convolutional neural networks, which reduces the need for computational resources (operations, runtime memory, disk space, etc.) and computational overhead in a convolutional neural network. Part of the reason that sparse kernels achieve efficient and effective results is that sparse kernels reduce the redundancy in a deep convolutional neural network; basically, in each convolutional kernel, not all of the samples are needed to differentiate objects in different classes. The complementary and sparse kernels described herein) achieve similar receptive fields while stacking convolutional layers.

With the deterministic complementary and sparse kernels, computations can be reduced (generally reduced exactly) in contrast to random pruning. Dedicated data flows for designed patterns can be designed. Further, sparse kernels also achieve multi-resolution feature extraction and keep spatial resolution for accurate location detection, and are thus useful for object detection tasks.

While other approaches based on kernel sparsification have demonstrated significant reductions in model size as well as computational cost, one of the limitations in these approaches is that sparsity penalties often lead to irregular patterns in kernels. This makes the computational gain in practice either too small or highly dependent on dedicated software or hardware handlings. In addition, sparsity learning needs a pre-trained model to start with and fine-tuning is required afterwards.

Figure 3:
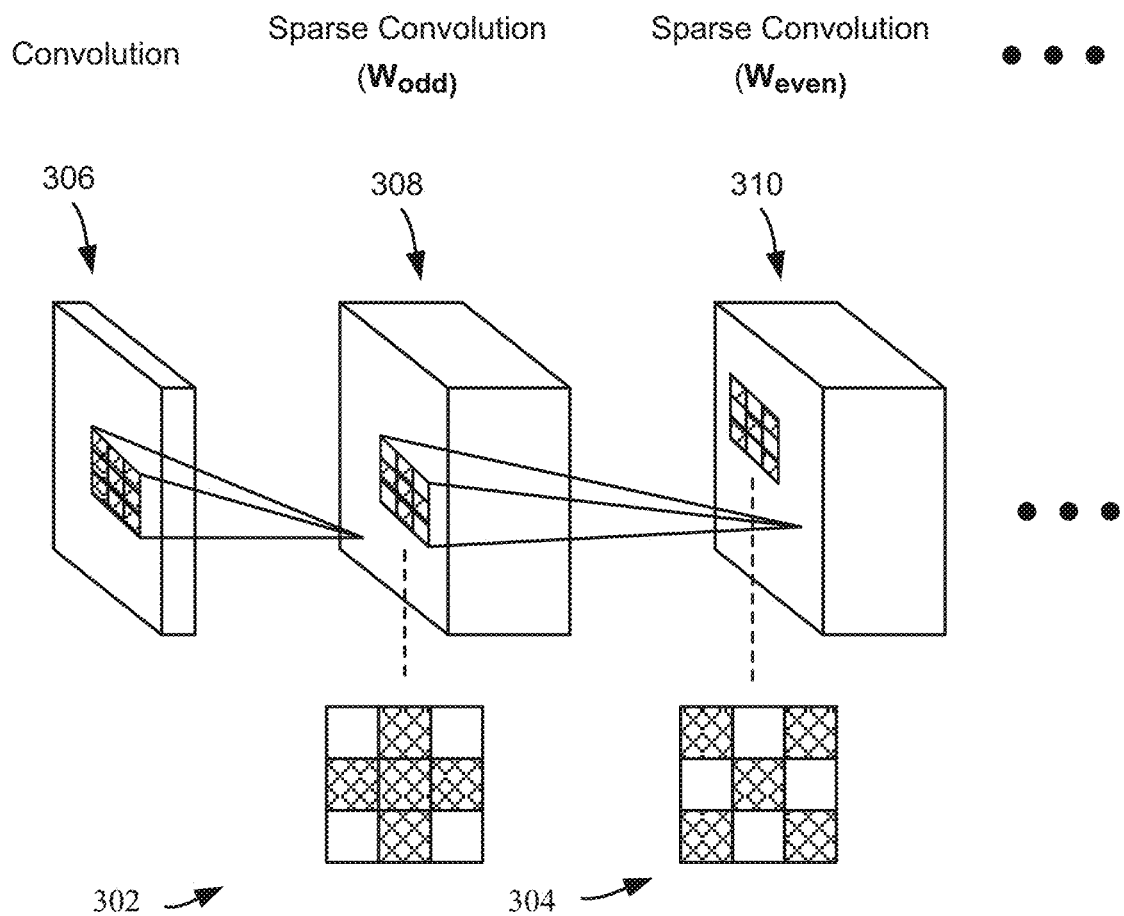
FIG. 3 illustrates an example representation of using sparse convolution based on sparse kernels to approximate the full kernels in a model in accordance with one or more embodiments described herein.

Turning to an example that overcomes the aforementioned limitations in sparsity learning, in FIG. 3 two sparse 3×3 kernels 302 and 304 are manually defined or otherwise selected to approximate full convolutions in convolutional neural network models. In FIG. 3, white boxes in the sparse kernels 302 and 304 represent skipped weights.

The two kernels, denoted by $W_{even}$ (the two-dimensional representation is labeled 304) and $W_{odd}$ (the two-dimensional representation is labeled 302) respectively, can be mathematically expressed by:

$$W_{even_{i,j,c,n}} = 0, \text{ if } (j \times k + i) \bmod 2 \neq 0$$

$$W_{odd_{i,j,c,n}} = 0, \text{ if } (j \times k + i) \bmod 2 \neq 1$$

and ($j \neq [k/2]$ and $i \neq [k/2]$), where (i,j) specifies the spatial location of a cell in a kernel, k is the kernel size, c is the channel index and n denotes the kernel index. The center point is kept nonzero for both $W_{even}$ and $W_{odd}$ as analysis suggests that this location, which often carries a large weight in the kernel, can be of significant importance for feature representation. Notwithstanding, this is not a requirement for sparse and complementary kernels, and indeed, it can be that there is no center point, e.g., if a pattern has an even number of kernels such as 4×4.

As can be seen in FIG. 3, convolution, represented by the three-dimensional representation of block 306, can be represented by sparse convolution using the sparse kernel 302 in a first layer (block 308) and sparse convolution using the complementary sparse kernel 304 in a subsequent layer (block 310), and so on.

Note that $W_{odd}$ and $W_{even}$ complement to each other, as a join of them in the spatial domain gives rise to a full coverage of the receptive field of the kernel. In the example of FIG. 3, wherein the kernel size is 3×3, $W_{even}$ is chosen to be a cross (×) shape and $W_{odd}$ is a plus sign (+) shape. Notwithstanding, full coverage is not necessary to be considered complements with respect to joined sparse kernel patterns; e.g., approximately ninety percent coverage may be sufficient in many scenarios, particularly with large kernels/patterns.

In general, the technology can compensate for some local details that are missing in sparse convolution, but needed for object detection. In addition, the sparse kernels are based on deterministic patterns, meaning that there is no need to use an index table to store their patterns in memory. Therefore, as opposed to other techniques, the technology described herein provides more consistent empirical running time.

Figure 4A:
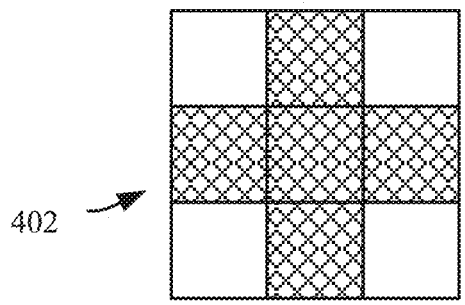
Figure 4B:
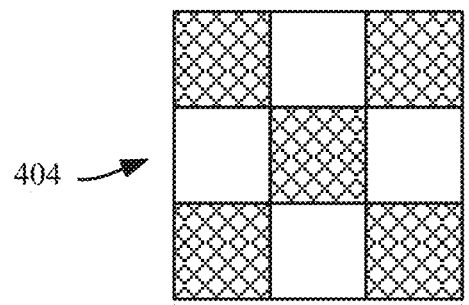
Figure 4C:
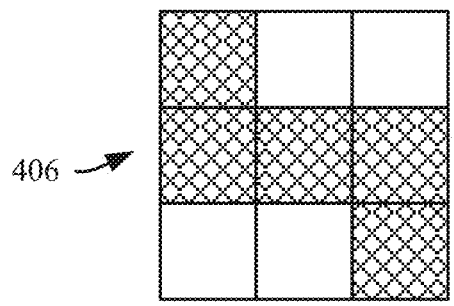
Figure 4D:
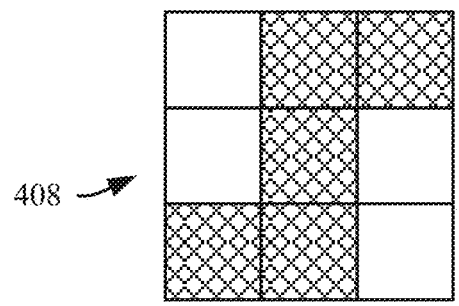
Figure 5A:
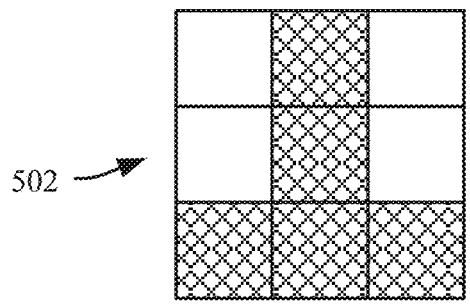
Figure 5B:
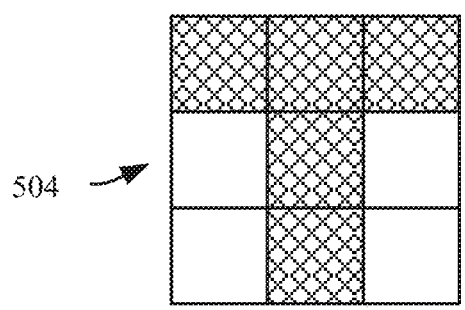
Figure 5C:
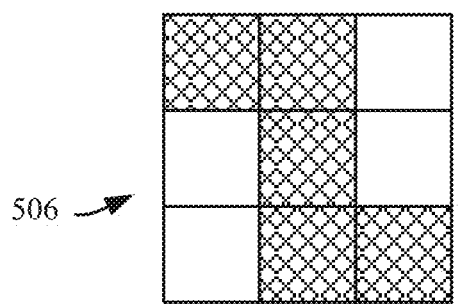
Figure 5D:
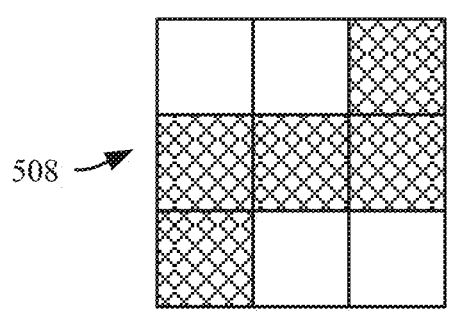
Figure 6A:
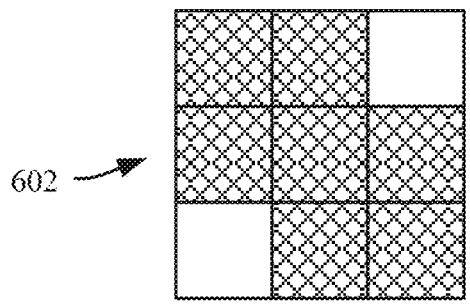
Figure 6B:
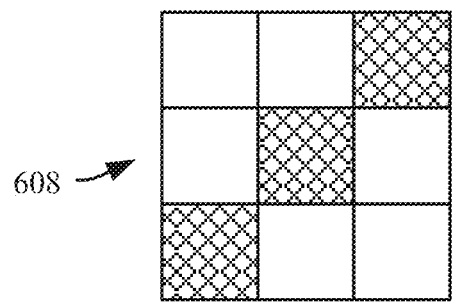
Figure 6C:
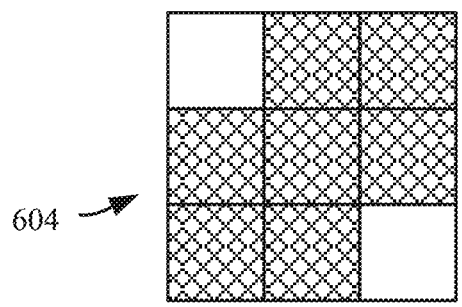
Figure 6D:
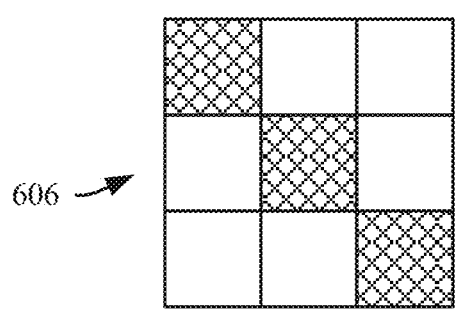
Figure 7A:
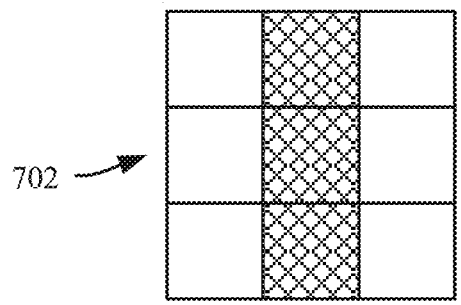
Figure 7B:
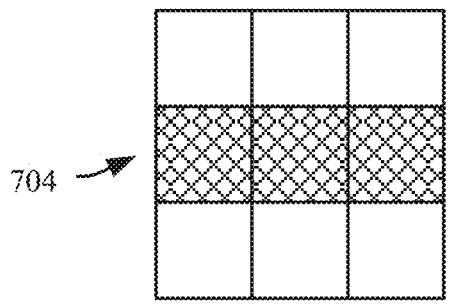
Figure 7C:
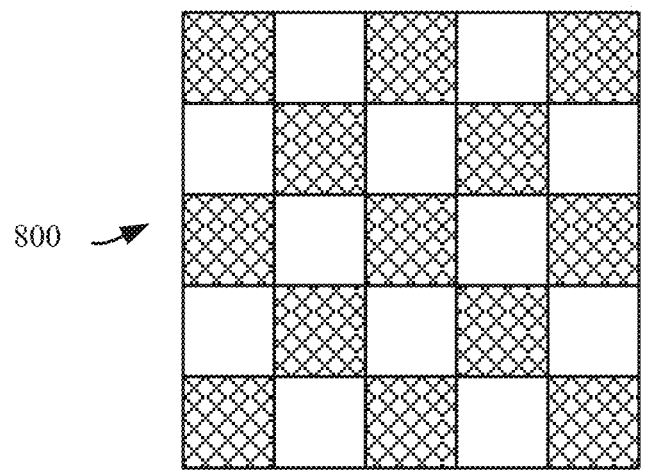
Figure 8A:
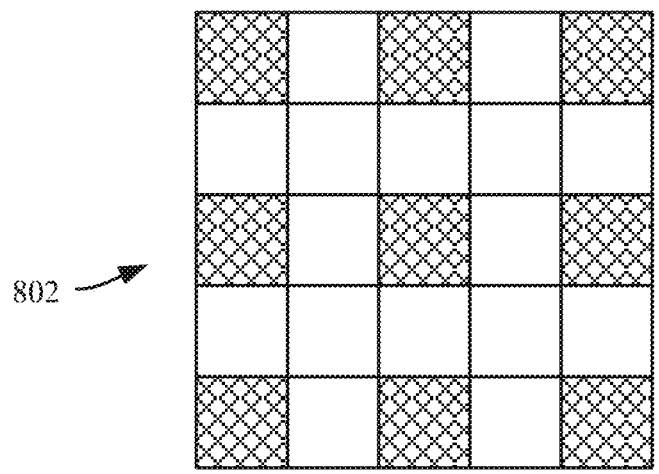
Figure 8B:
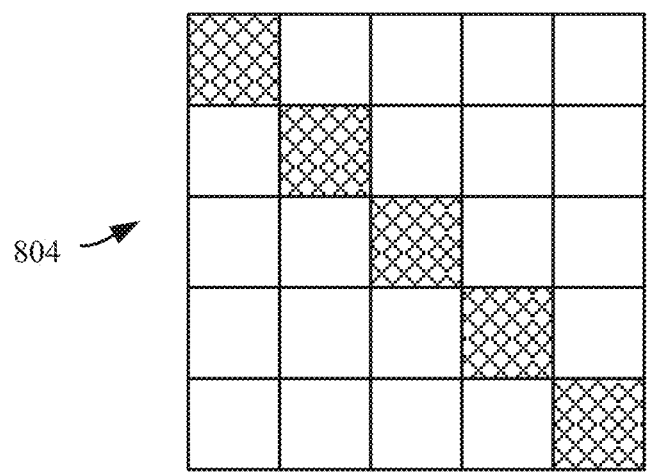
Figure 8C:
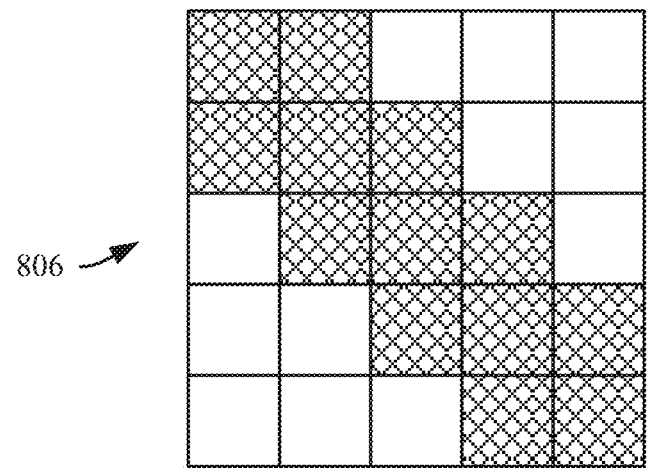
Figure 9A:
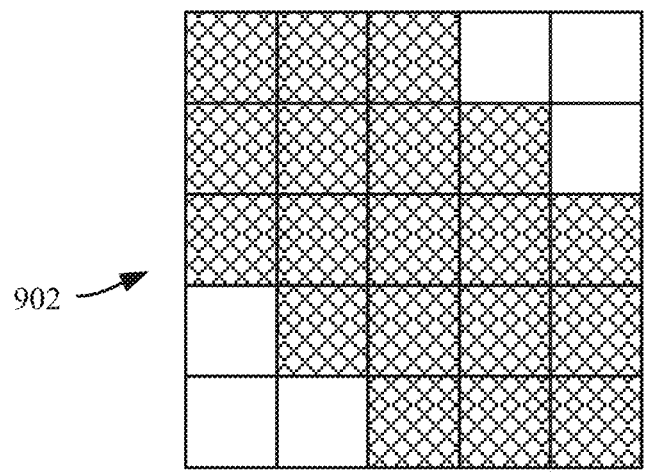
Figure 9B:
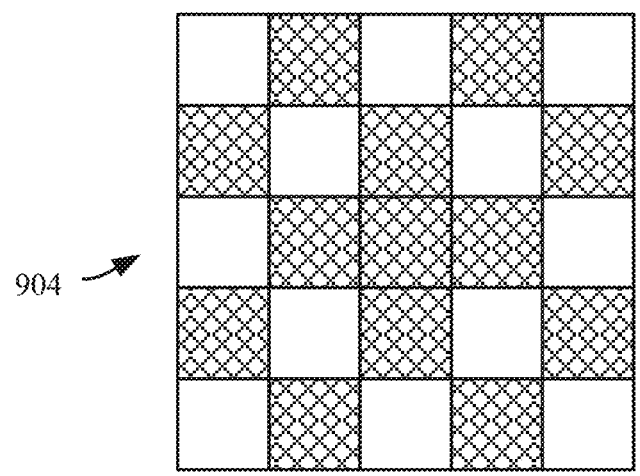
Figure 9C:
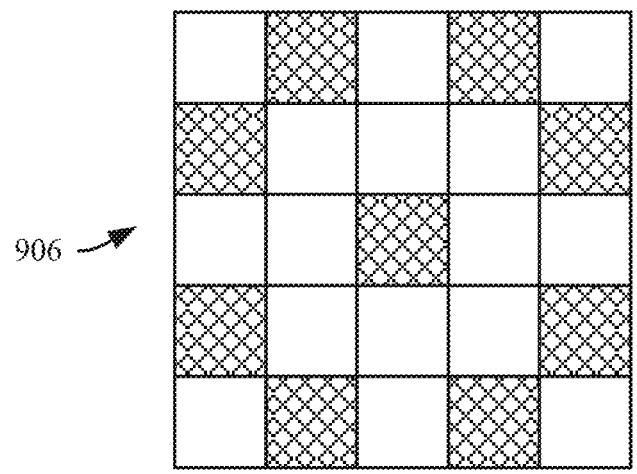
Figure 10A:
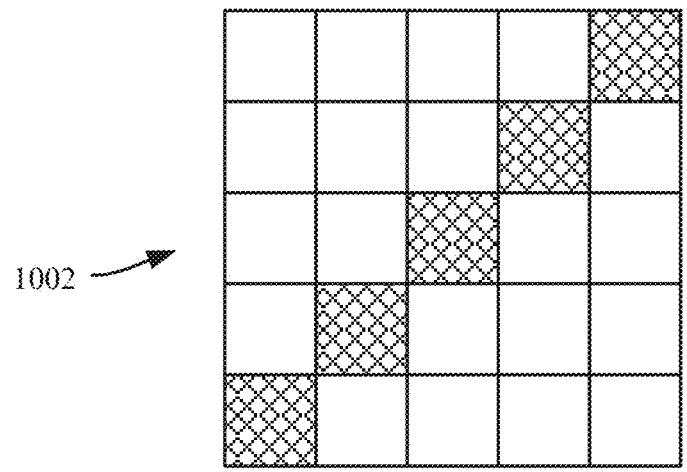
Figure 10B:
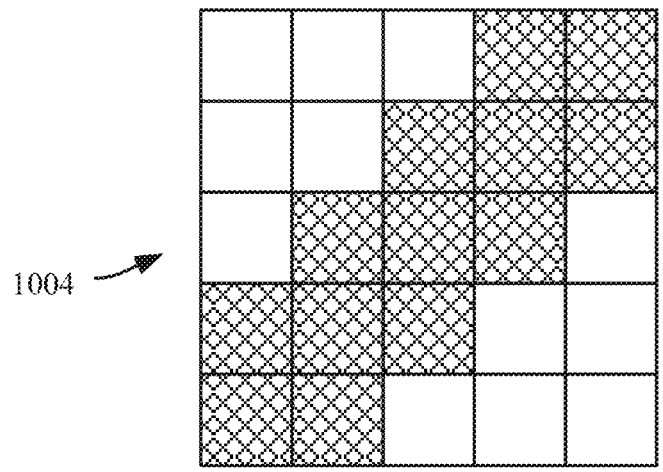
Figure 10C:
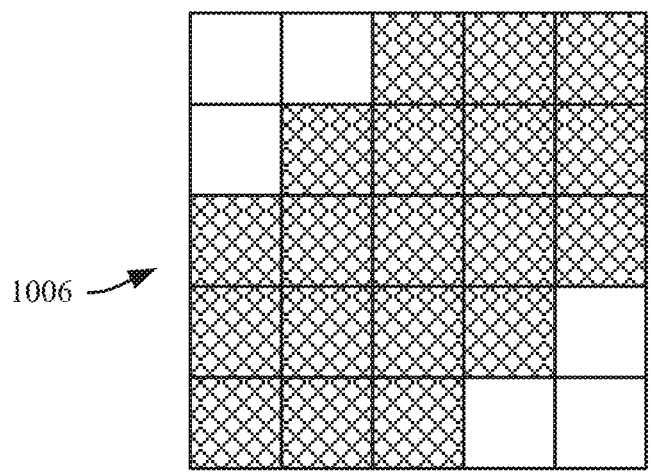

FIGS. 4A-4D, 5A-5D, 6A-6D, 7A and 7B show non-limiting example patterns for 3×3 kernels. FIG. 7C along with FIGS. 8A-8C, 9A-9C and 10A-10C show non-limiting example patterns for 5×5 sparse kernels, respectively. In general, full complementary coverage may be obtained by selectively pairing a sparse kernel with another complementary sparse kernel that provides full coverage, e.g., sparse kernel 402 (FIG. 4A) with sparse kernel 404 (FIG. 4B), corresponding to sparse kernels 302 and 304 (of FIG. 3), or sparse kernel 406 (FIG. 4B) with sparse kernel 408 (FIG. 4B). However, full coverage can be unnecessary in certain scenarios, e.g., pairing kernel 702 of. FIG. 7A with kernel 704 of FIG. 7B can provide sufficient results in some scenarios.

Figure 11:
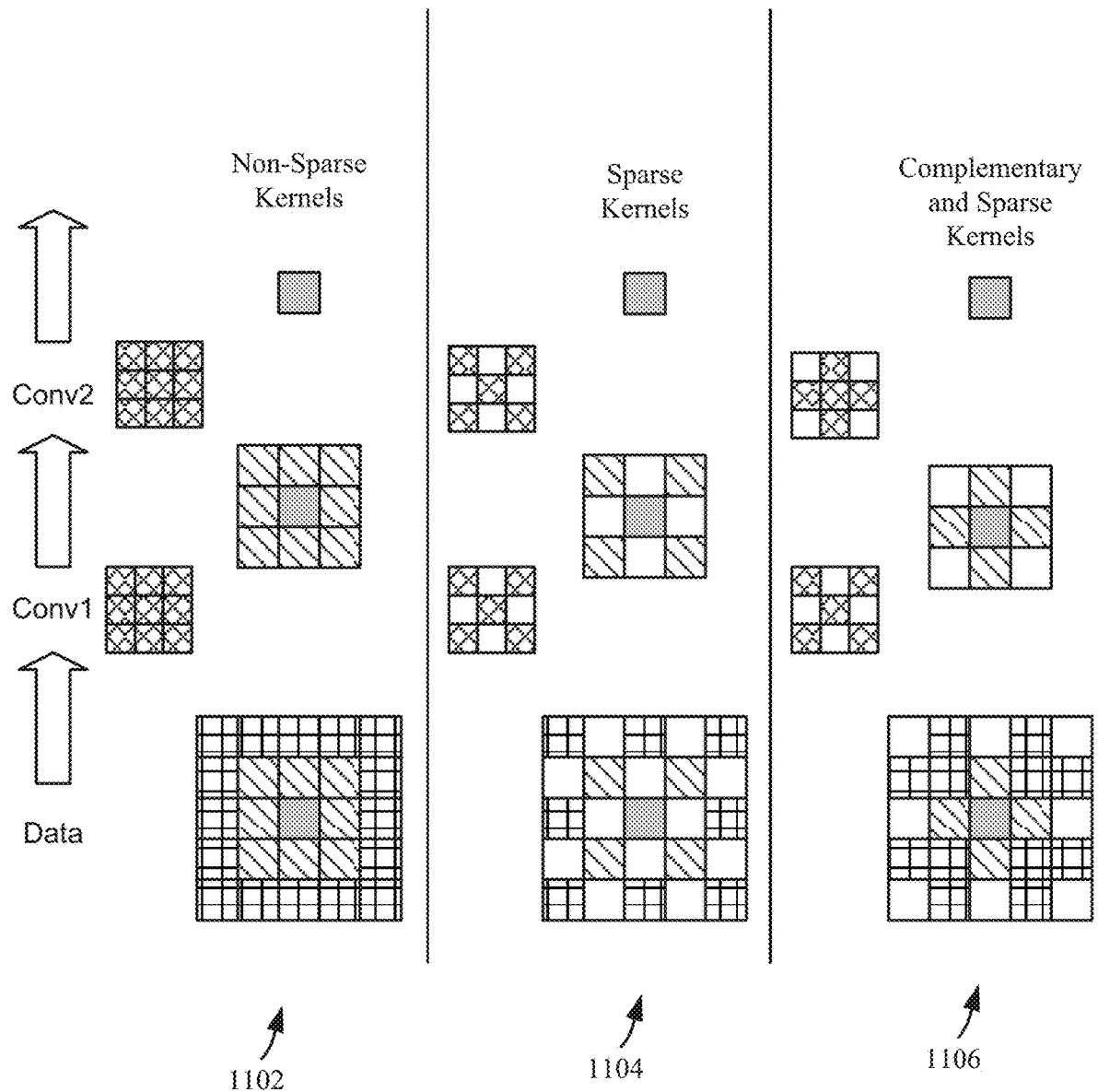
FIGS. 11 and 12 illustrate examples of using sparse kernels versus using complementary and sparse kernels in accordance with one or more embodiments described herein.

FIG. 11 contrasts the use of non-sparse kernels (column 1102) against sparse kernels (column 1104) and complementary and sparse kernels (column 1106). In general, complementary and sparse kernels achieve a larger receptive field relative to single sparse kernels (3×3, first convolution, followed by 3×3, second convolution), while being far more efficient than non-sparse kernels with respect to computational resource consumption.

Figure 12:
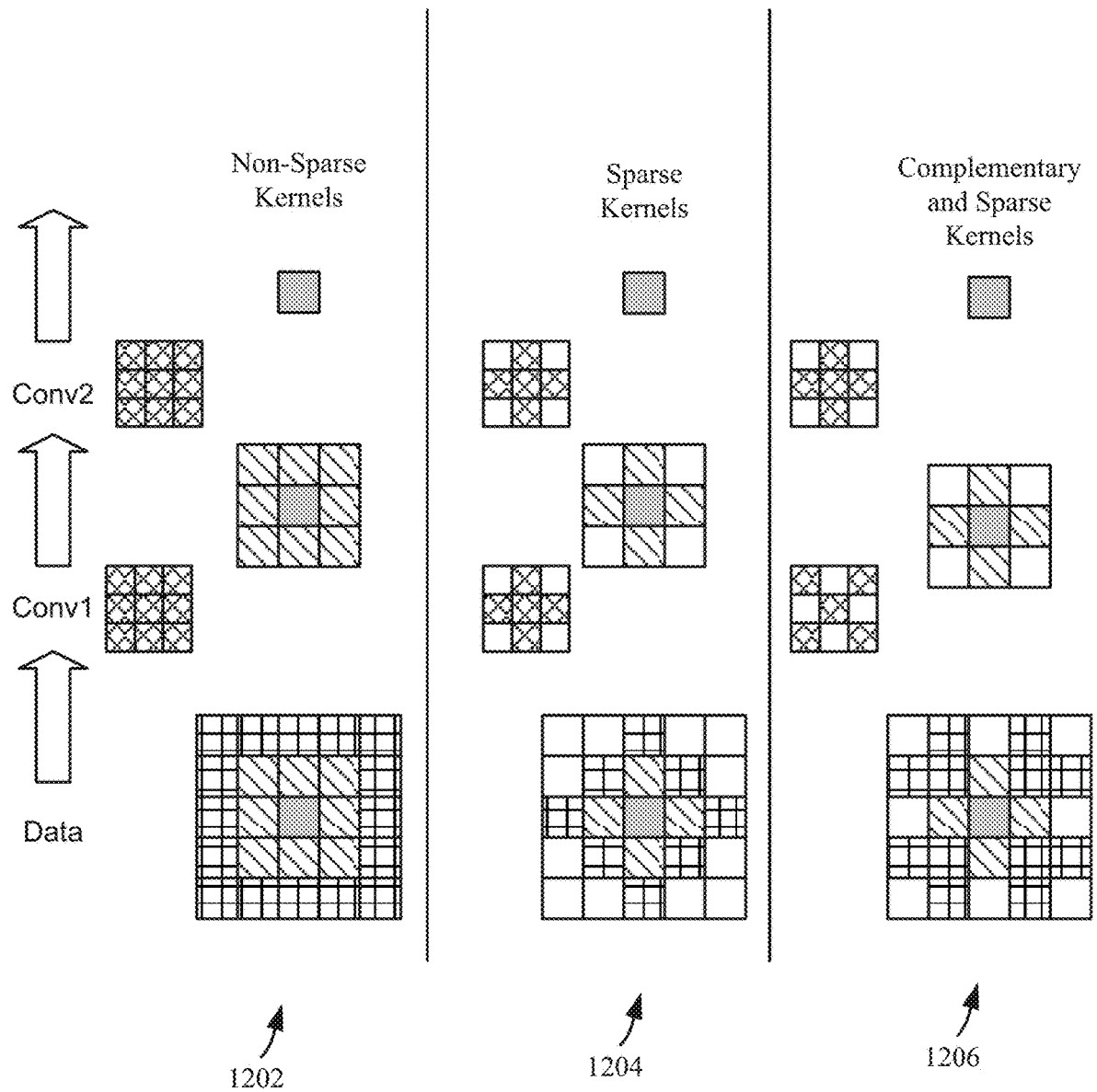

FIG. 12 similarly contrasts the use of non-sparse kernels (column 1202) against sparse kernels (column 1204) and complementary and sparse kernels (column 1206). Note the different pattern of the data in column 1204 of FIG. 12 relative to column 1104 of FIG. 11, and the use of plus sign-shaped (+) sparse kernel patterns in in column 1204 of FIG. 12 relative to the cross-shaped (×) sparse kernel patterns in column 1104 of FIG. 11. With only sparse kernels the receptive field can be changed, and not sufficiently enough to cover the information of previous layers.

Figure 13:
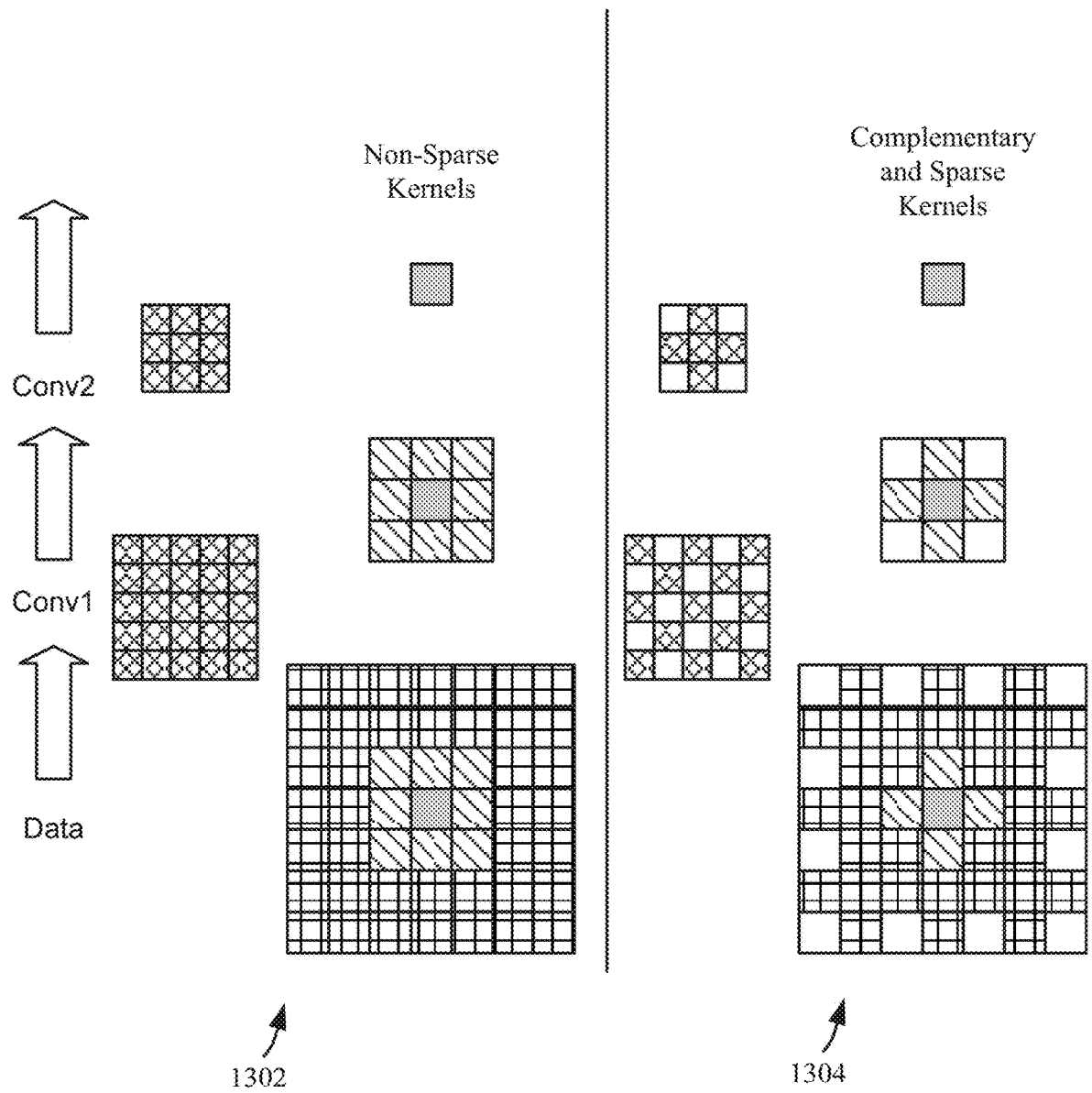
FIG. 13 illustrates an example of using 5×5 sparse kernels in a first convolution and 3×3 complementary and sparse kernels in a second convolution in accordance with one or more embodiments described herein.

FIG. 13 exemplifies a first convolution using a 5×5 kernel in a non-sparse (column 1302) pattern versus a 5×5 kernel in a sparse (column 1304) pattern, followed by 3×3 pattern in a second convolution, with the sparse 3×3 kernel being complementary to an extent with the sparse 5×5 kernel in column 1304. Again, complementary and sparse kernels achieve a relatively large receptive field.

By way of example, consider the following experimental results that used a dataset of ImageNet with a 1k-classification task. The AlexNet architecture was used with different sparse kernels; AlexNet has five convolutional layers, and the experiment deployed either sparse or complementary kernels for all layers.

Results:

| | Alex Reference | Alex Sparse 1 (sparse and complementary kernels used) | Alex Sparse 2 (only one type of sparse kernels used) |
|---|---|---|---|
| Top-5 accuracy | 80.46 | 79.73 | 79.18 |
| Speedup for full network (GPU) | — | ↑1.48x | ↑1.48x |
| Speedup for full network (Theoretical) | — | ↑1.74x | ↑1.74x |
| Number of Parameters in Convolutional Layers | — | ↓1.81x | ↓1.81x |

As can be seen, accuracy was very close to the reference value, and was better with sparse and complimentary kernels relative to only sparse kernels. At the same time, the speedup increase was significant, as was the decrease in the number of parameters in the convolutional layers.

Figure 14:
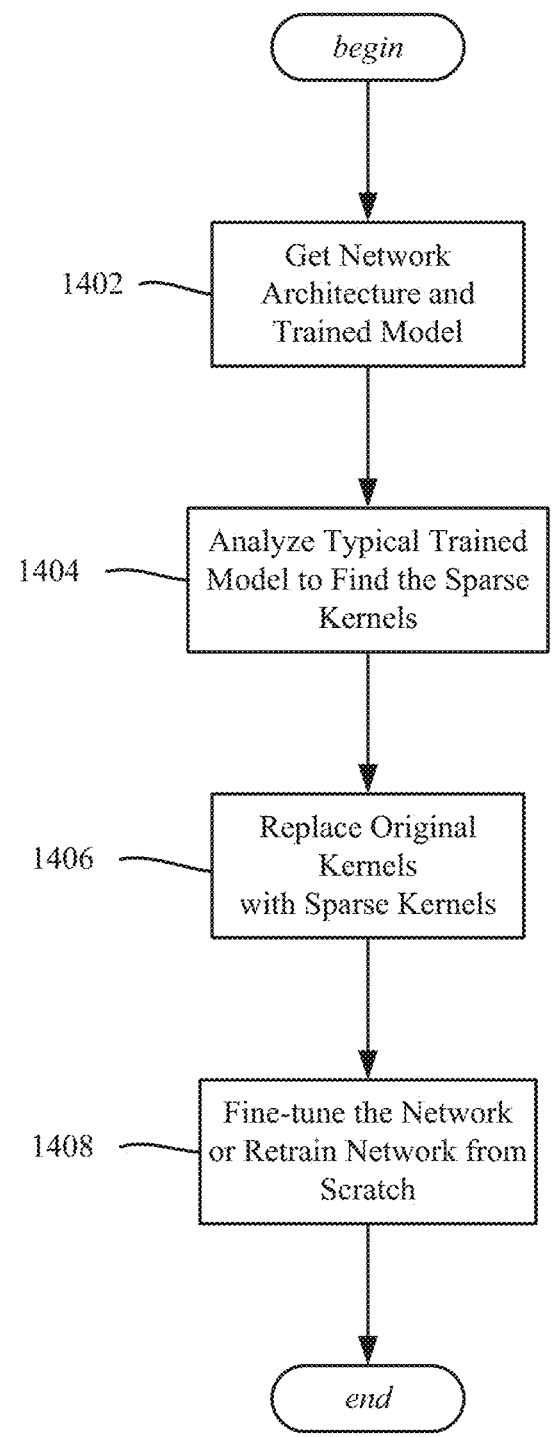
FIG. 14 illustrates a flow diagram of example operations to use sparse and complementary kernels in accordance with one or more embodiments described herein.

FIG. 14 is a flow diagram showing general example operations of the technology described herein. Operation 1402 represents getting the network architecture and the trained model, (e.g., by the analysis component 104 of FIG. 1). The model may be typical trained model, and is analyzed at operation 1404 to find the (original) sparse kernels, (e.g., by the analysis component 104 of FIG. 1).

Operation 1406 represents replacing the original kernels with the sparse kernels, such as based on their weights as described above (e.g., by the replacement component 106 of FIG. 1). Further, note that the sparse kernels can be sparse and complementary kernels as described herein, e.g., sparse kernels in the initial layer, complementary kernels to those sparse kernels in a subsequent layer, complementary kernels to those complementary kernels in a next subsequent layer, and so on, until the various layers as known from the architecture (operation 1402) have sparse kernels.

Operation 1408 represents using the layers of sparse kernels to fine tune the network (e.g., by the fine-tuning component 108 of FIG. 1) or alternatively retrain the network (e.g., by the training component 110 of FIG. 1) from scratch. Note that operation 1408 may be performed by a separate process or entity.

Figure 15:
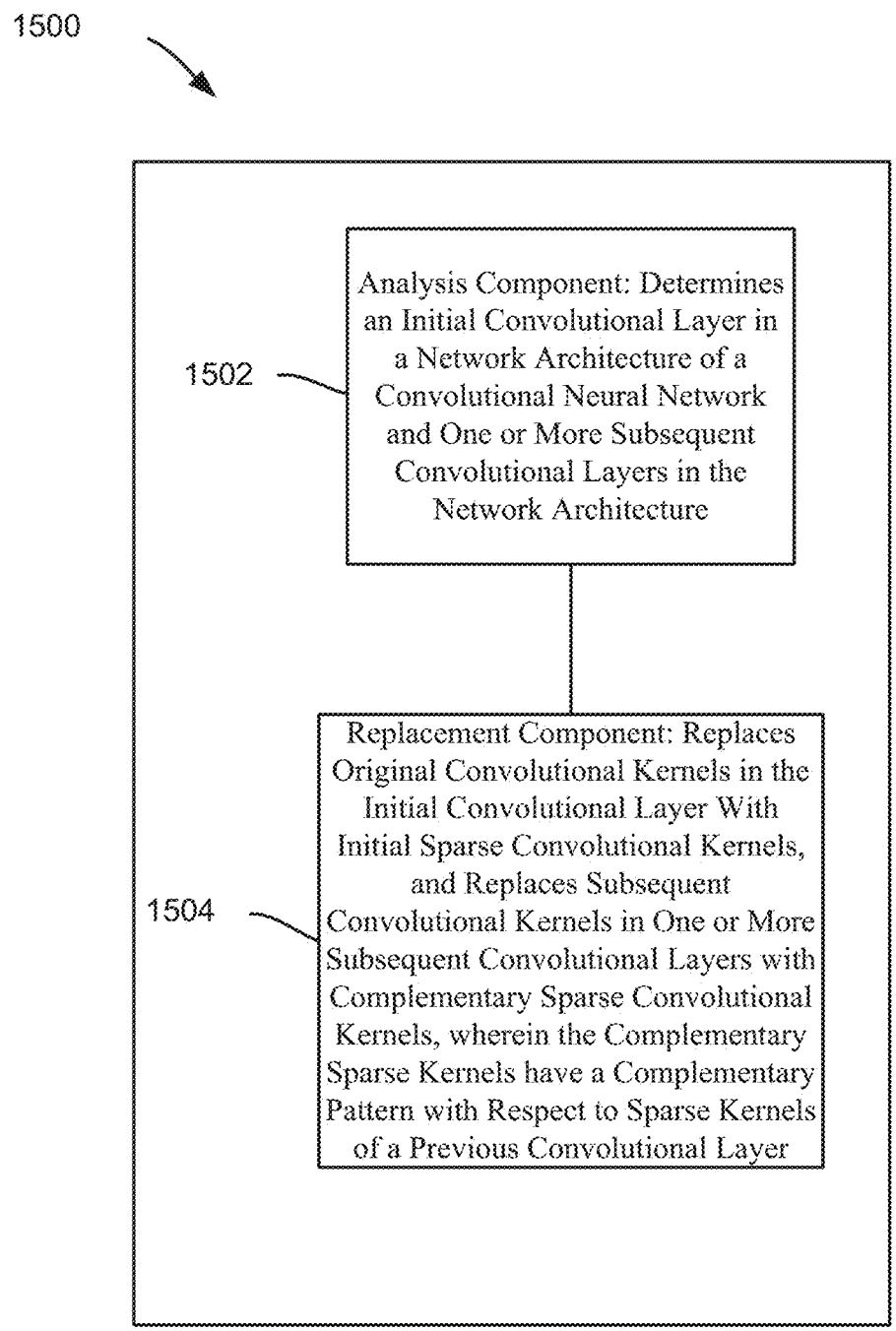
FIG. 15 illustrates a block diagram of an example, non-limiting system that facilitates using sparse and complementary kernels in accordance with one or more embodiments described herein

FIG. 15 is a representation of a system 1500, which can comprise a memory that stores computer executable components and a processor that executes computer executable components stored in the memory. The computer executable components can comprise an analysis component (block 1502) that determines an initial convolutional layer in a network architecture of a convolutional neural network and one or more subsequent convolutional layers in the network architecture. The computer executable components can further comprise a replacement component (block 1504) that replaces original convolutional kernels in the initial convolutional layer with initial sparse convolutional kernels, and replaces subsequent convolutional kernels in one or more subsequent convolutional layers with complementary sparse convolutional kernels, wherein the complementary sparse kernels have a complementary pattern with respect to sparse kernels of a previous convolutional layer.

The analysis component can analyze a trained model to determine the sparse kernels. The analysis component can determine the sparse kernels based on weight data. The analysis component can determine the sparse kernels based on a similarity measure with respect to a most similar sparse pattern inherited from pre-trained weights relative to the original kernels, and the replacement component can use most similar sparse kernels to replace the original kernels in the initial convolutional layer.

The system can comprise a training component that uses the sparse convolutional kernels and complementary convolutional kernels to train another convolutional neural network model. The system can comprise a tuning component that uses the sparse convolutional kernels and complementary convolutional kernels to tune a convolutional neural network model.

For a kernel, the replacement component can replace the kernel with a complementary sparse kernel relative to the previous layer or a with another sparse kernel having a most similar sparse pattern, relative to a previous convolutional layer of the one or more subsequent convolutional layers. At least one of the sparse kernels can comprise a 3×3 kernel size. At least one of the sparse kernels can comprise a 5×5 kernel size.

Figure 16:
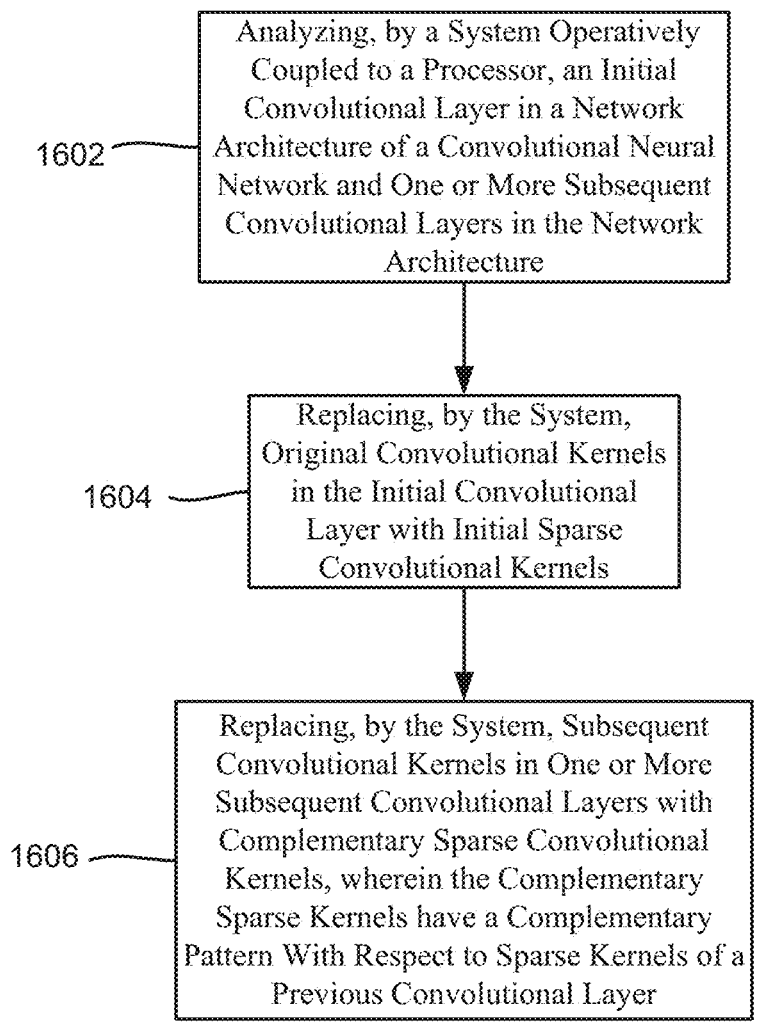
FIG. 16 illustrates a flow diagram of an example, non-limiting computer-implemented method in accordance with one or more embodiments described herein.

FIG. 16 exemplifies example operations of a computer-implemented method, comprising, analyzing (operation 1602, such as performed by the analysis component 104 of FIG. 1), by a system operatively coupled to a processor, an initial convolutional layer in a network architecture of a convolutional neural network and one or more subsequent convolutional layers in the network architecture. Operation 1604 represents replacing, by the system, original convolutional kernels in the initial convolutional layer with initial sparse convolutional kernels. Operation 1606 represents replacing, by the system, subsequent convolutional kernels in one or more subsequent convolutional layers with complementary sparse convolutional kernels, wherein the complementary sparse kernels have a complementary pattern with respect to sparse kernels of a previous convolutional layer. The replacement component 106 of FIG. 1 can, for example, perform operations 1604 and 1606 in one or more embodiments.

The analyzing can further comprise analyzing a trained model to determine the original convolutional kernels. The analyzing can determine the sparse kernels based on a similarity measure with respect to a most similar sparse pattern inherited from pre-trained weights relative to the original kernels.

Aspects can further comprise using, by the system, the sparse convolutional kernels and complementary convolutional kernels to train another convolutional neural network model. Aspects can further comprise using, by the system, the sparse convolutional kernels and complementary convolutional kernels to tune a convolutional neural network model.

Replacing the subsequent convolutional kernels in the one or more subsequent convolutional layers with the complementary sparse convolutional kernels can comprise replacing a kernel with a complementary sparse kernel relative to the previous convolutional layer.

Figure 17:
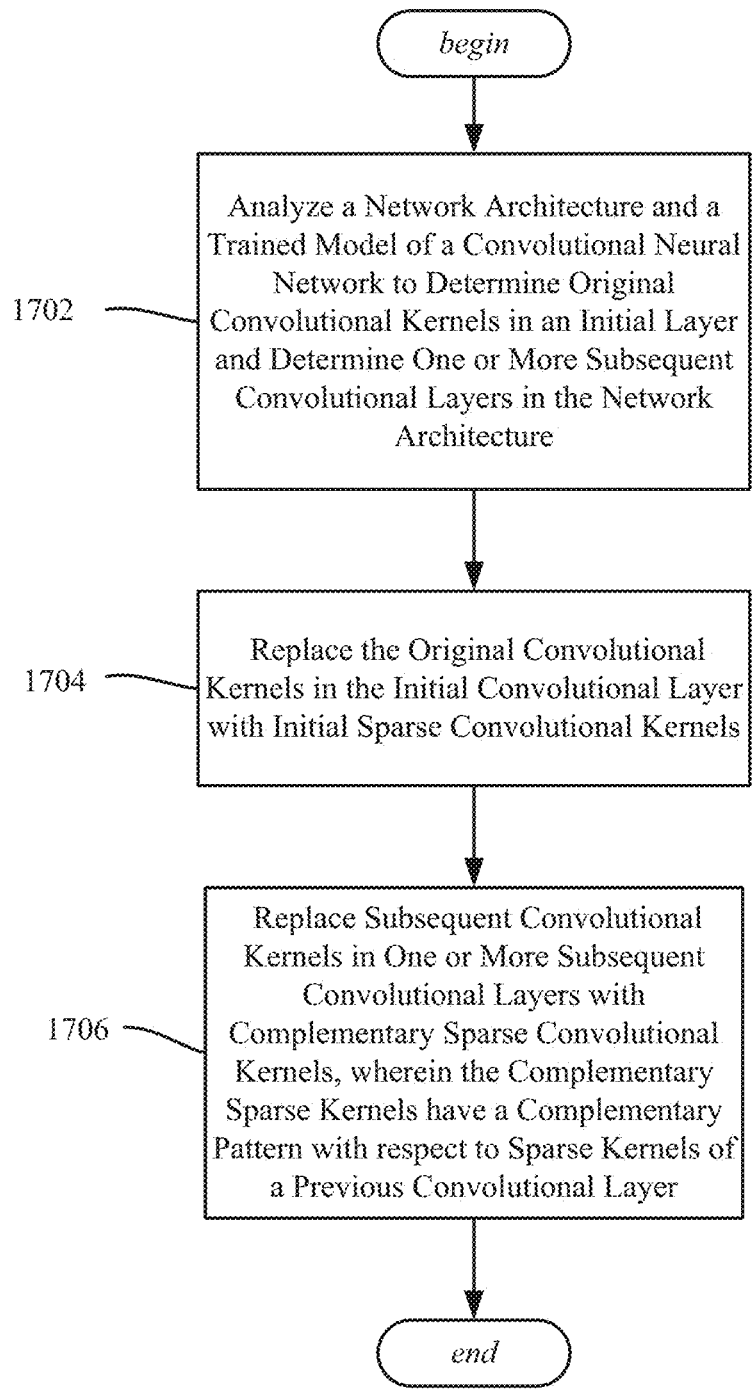
FIG. 17 illustrates a flow diagram of an example, non-limiting computer-program product facilitating using sparse and complementary kernels in accordance with one or more embodiments described herein.

FIG. 17 exemplifies a computer program product facilitating providing efficient convolution neural networks, in which the computer program product comprises a computer readable storage medium having program instructions embodied therewith. The program instructions can be executable by a processor to cause the processor to analyze (block 1702, such as performed by the analysis component 104 of FIG. 1) a network architecture and a trained model of a convolutional neural network to determine original convolutional kernels in an initial layer and determine one or more subsequent convolutional layers in the network architecture. The program instructions can be further executable to replace (block 1704) the original convolutional kernels in the initial convolutional layer with initial sparse convolutional kernels, and replace (block 1706) subsequent convolutional kernels in one or more subsequent convolutional layers with complementary sparse convolutional kernels, wherein the complementary sparse kernels have a complementary pattern with respect to sparse kernels of a previous convolutional layer. The replacement component 106 of FIG. 1 can, for example, perform operations 1704 and 1706 in one or more embodiments.

The program instructions can be further executable by the processor to cause the processor to determine the one or more original convolutional kernels and the sparse kernels to replace the original kernels based on weight data. The program instructions can be further executable by the processor to cause the processor to determine the one or more original convolutional kernels and the sparse kernels to replace the original kernels based on similarity data.

The program instructions can be further executable by the processor to cause the processor to tune a convolutional neural network model based on the sparse convolutional kernels in the layers. The program instructions can be further executable by the processor to cause the processor to train a convolutional neural network model based on the sparse convolutional kernels in the layers.

As can be seen, the technology described herein can replace original convolutional kernels with sparse kernels in training to learn the sparsity, whereby a trained network can reduce its computational resources. The technology can use sparse complementary kernels to compensate the insufficiency of sparse kernels to achieve comparative algorithmic performance. Equivalent receptive fields can be achieved by stacking complementary and sparse kernels alternatives. The technology can design new architecture appropriate for detection with sparse and complementary kernels. Sparse kernels also can achieve multi-resolution feature extraction but keeps spatial resolution for accurate location detection.

The technology can train a convolutional neural network from scratch to achieve an end-to-end solution, in contrast to than post processing procedures. The technology can use a collection of complementary and sparse kernels to achieve similar receptive fields while stacking convolutional layers to reduce computational resource (operations, memory, disk space, etc.).

Moreover, the technology is compatible with existing technology, and can, for example, measure the importance of kernels and neurons to prune the unimportant kernels and neurons, remove more parameter redundancy by pruning unimportant weights in sparse and complementary kernels and integrate different kernel design patterns to explore more sparse convolutional kernels.

Figure 18:
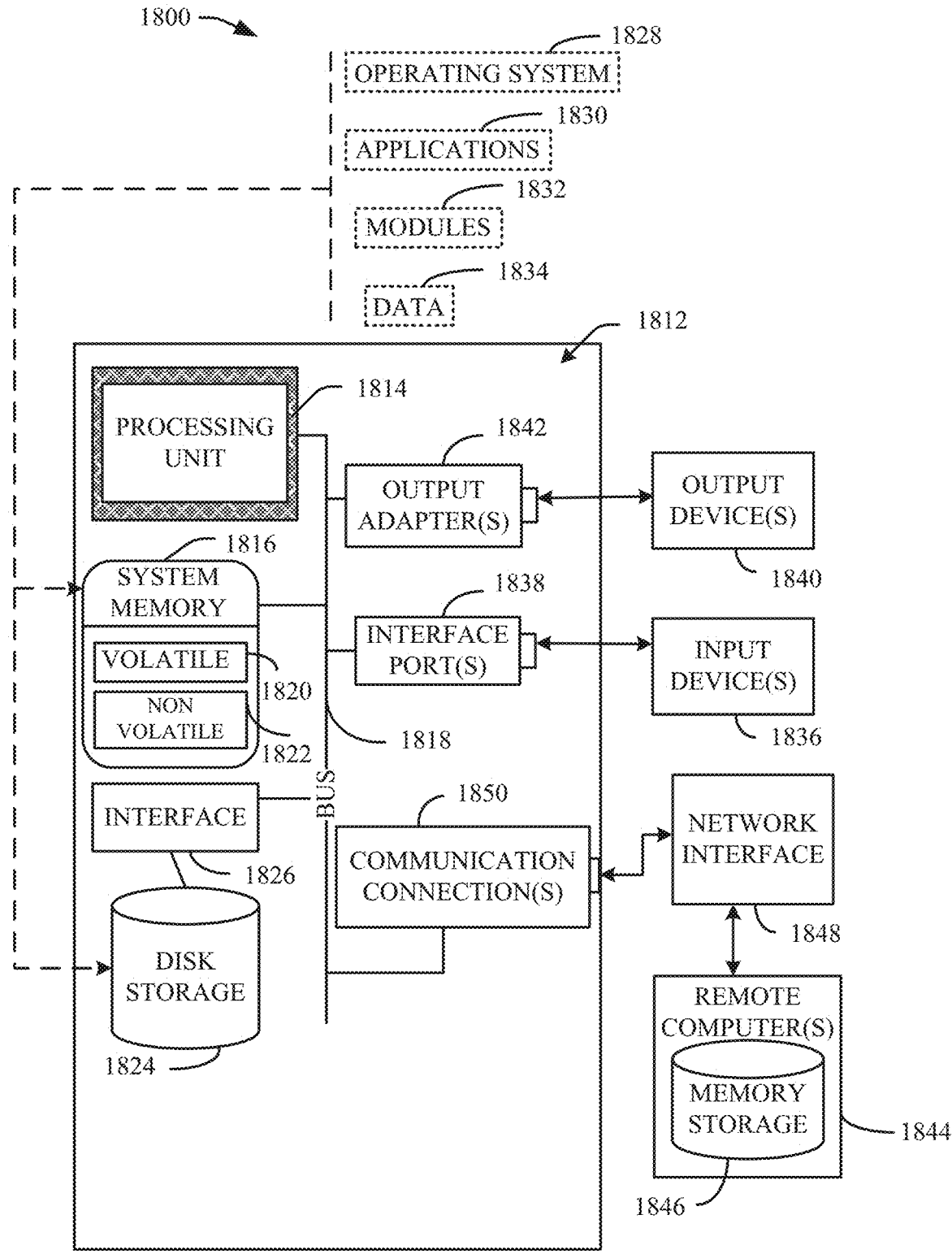
FIG. 18 illustrates a block diagram of an example, non-limiting operating environment in which one or more embodiments described herein can be facilitated.

In order to provide a context for the various aspects of the disclosed subject matter, FIG. 18 as well as the following discussion are intended to provide a general description of a suitable environment in which the various aspects of the disclosed subject matter can be implemented. FIG. 18 illustrates a block diagram of an example, non-limiting operating environment in which one or more embodiments described herein can be facilitated. Repetitive description of like elements employed in other embodiments described herein is omitted for sake of brevity.

With reference to FIG. 18, a suitable operating environment 1800 for implementing various aspects of this disclosure can also include a computer 1812. The computer 1812 can also include a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814. The system bus 1818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1816 can also include volatile memory 1820 and nonvolatile memory 1822. The basic input/output system (BIOS), containing the basic routines to transfer information between elements within the computer 1812, such as during start-up, is stored in nonvolatile memory 1822. Computer 1812 can also include removable/non-removable, volatile/non-volatile computer storage media. FIG. 18 illustrates, for example, a disk storage 1824. Disk storage 1824 can also include, but is not limited to, devices like a magnetic disk drive, floppy disk drive, tape drive, Jaz drive, Zip drive, LS-100 drive, flash memory card, or memory stick. The disk storage 1824 also can include storage media separately or in combination with other storage media. To facilitate connection of the disk storage 1824 to the system bus 1818, a removable or non-removable interface is typically used, such as interface 1826. FIG. 18 also depicts software that acts as an intermediary between users and the basic computer resources described in the suitable operating environment 1800. Such software can also include, for example, an operating system 1828. Operating system 1828, which can be stored on disk storage 1824, acts to control and allocate resources of the computer 1812.

System applications 1830 take advantage of the management of resources by operating system 1828 through program modules 1832 and program data 1834, e.g., stored either in system memory 1816 or on disk storage 1824. It is to be appreciated that this disclosure can be implemented with various operating systems or combinations of operating systems. A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port can be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a computer, a server, a router, a network PC, a workstation, a microprocessor based appliance, a peer device or other common network node and the like, and typically can also include many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1850 refers to the hardware/software employed to connect the network interface 1848 to the system bus 1818. While communication connection 1850 is shown for illustrative clarity inside computer 1812, it can also be external to computer 1812. The hardware/software for connection to the network interface 1848 can also include, for exemplary purposes only, internal and external technologies such as, modems including regular telephone grade modems, cable modems and DSL modems, ISDN adapters, and Ethernet cards.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer executable components;
 a processor that executes computer executable components stored in the memory, wherein the computer executable components comprise:
   an analysis component that analyzes an initial convolutional layer in a network architecture of a convolutional neural network and one or more subsequent convolutional layers in the network architecture; and
   a replacement component that replaces original convolutional kernels in the initial convolutional layer with initial sparse convolutional kernels, and replaces subsequent convolutional kernels in one or more subsequent convolutional layers with complementary sparse convolutional kernels, wherein the complementary sparse convolutional kernels have a complementary pattern with respect to sparse kernels of a previous convolutional layer, wherein the complementary pattern is a pattern wherein a join of a one of the original convolutional kernels in the initial convolutional layer and a one of the complementary sparse convolutional kernels in the one or more subsequent convolutional layers in a spatial domain results in a full coverage of a receptive field of a kernel, and wherein the one of the original convolutional kernels and the one of the complementary sparse convolutional kernels comprise $W_{even_{i,j,c,n}}=0$, if $(j \times k+i) \bmod 2 \neq 0$ and $W_{odd_{i,j,c,n}}=0$, if $(j \times k+i) \bmod 2 \neq 1$ and $(j \neq [k/2]$ and $i \neq [k/2])$, where (i,j) specifies a spatial location of a cell in a kernel, k is the size of the one of the original convolutional kernels or the one of the complementary sparse convolutional kernels, c is a channel index and n denotes an index of the one of the original convolutional kernels or the one of the complementary sparse convolutional kernels.

2. The system of claim 1, wherein the analysis component analyzes a trained model to determine the original sparse kernels.

3. The system of claim 2, wherein the analysis component determines the sparse kernels based on weight data.

4. The system of claim 2, wherein the analysis component determines the sparse kernels based on a similarity measure with respect to a most similar sparse pattern inherited from pre-trained weights relative to the original convolutional kernels, and the replacement component uses most similar sparse kernels to replace the original convolutional kernels in the initial convolutional layer.

5. The system of claim 1, further comprising a training component that uses the initial sparse convolutional kernels and complementary convolutional kernels to train another convolutional neural network model.

6. The system of claim 1, further comprising a tuning component that uses the initial sparse convolutional kernels and complementary convolutional kernels to tune a convolutional neural network model.

7. The system of claim 1, wherein relative to a previous convolutional layer of the one or more subsequent convolutional layers, for a kernel, the replacement component replaces the kernel with a complementary sparse kernel relative to the previous convolutional layer or with another sparse kernel having a most similar sparse pattern.

8. The system of claim 1, wherein at least one of the sparse kernels comprises a 3×3 kernel size, and wherein a first center point of the one of the complementary sparse kernels and a second center point of the one of the convolutional kernels is nonzero.

9. The system of claim 1, wherein at least one of the sparse kernels comprises a 5×5 kernel size.

10. A computer-implemented method, comprising:
analyzing, by a system operatively coupled to a processor, an initial convolutional layer in a network architecture of a convolutional neural network and one or more subsequent convolutional layers in the network architecture;
replacing, by the system, original convolutional kernels in the initial convolutional layer with initial sparse convolutional kernels; and
replacing, by the system, subsequent convolutional kernels in one or more subsequent convolutional layers with complementary sparse convolutional kernels, wherein the complementary sparse convolutional kernels have a complementary pattern with respect to sparse kernels of a previous convolutional layer, and wherein the complementary pattern is a pattern wherein a join of a one of the original convolutional kernels in the initial convolutional layer and a one of the complementary sparse convolutional kernels in the one or more subsequent convolutional layers in a spatial domain results in a full coverage of a receptive field of a kernel, and wherein the one of the original convolutional kernels and the one of the complementary sparse convolutional kernels comprise $W_{even_{i,j,c,n}}=0$, if $(j \times k+i) \bmod 2 \neq 0$ and $W_{odd_{i,j,c,n}}=0$, if $(j \times k+i) \bmod 2 \neq 1$ and $(j \neq [k/2]$ and $i \neq [k/2])$, where (i,j) specifies a spatial location of a cell in a kernel, k is the size of the one of the original convolutional kernels or the one of the complementary sparse convolutional kernels, c is a channel index and n denotes an index of the one of the original convolutional kernels or the one of the complementary sparse convolutional kernels.

11. The computer-implemented method of claim 10, wherein the analyzing further comprises analyzing a trained model to determine the original convolutional kernels.

12. The computer-implemented method of claim 11, wherein the analyzing determines the sparse kernels based on a similarity measure with respect to a most similar sparse pattern inherited from pre-trained weights relative to the original convolutional kernels.

13. The computer-implemented method of claim 10, further comprising using, by the system, the complementary sparse convolutional kernels and complementary convolutional kernels to train another convolutional neural network model.

14. The computer-implemented method of claim 10, further comprising using, by the system, the complementary sparse convolutional kernels and complementary convolutional kernels to tune a convolutional neural network model.

15. The computer-implemented method of claim 10, wherein the replacing the subsequent convolutional kernels in the one or more subsequent convolutional layers with the complementary sparse convolutional kernels comprises replacing a kernel with a complementary sparse kernel relative to the previous convolutional layer.

16. A computer program product facilitating providing efficient convolution neural networks and comprising a computer readable storage medium having program instructions embodied therewith, the program instructions executable by a processor to cause the processor to:
analyze a network architecture and a trained model of a convolutional neural network to determine original convolutional kernels in an initial convolutional layer and determine one or more subsequent convolutional layers in the network architecture;
replace the original convolutional kernels in the initial convolutional layer with initial sparse convolutional kernels; and
replace subsequent convolutional kernels in one or more subsequent convolutional layers with complementary sparse convolutional kernels, wherein the complementary sparse convolutional kernels have a complementary pattern with respect to sparse kernels of a previous convolutional layer, wherein the complementary pattern is a pattern wherein a join of a one of the original convolutional kernels in the initial convolutional layer and a one of the complementary sparse convolutional kernels in the one or more subsequent convolutional layers in a spatial domain results in a full coverage of a receptive field of a kernel, and wherein the one of the original convolutional kernels and the one of the complementary sparse convolutional kernels comprise $W_{even_{i,j,c,n}} = 0$, if $(j \times k + i) \bmod 2 \neq 0$ and $W_{odd_{i,j,c,n}} = 0$, if $(j \times k + i) \bmod 2 \neq 1$ and $(j \neq [k/2]$ and $i \neq [k/2])$, where (i,j) specifies a spatial location of a cell in a kernel, k is the size of the one of the original convolutional kernels or the one of the complementary sparse convolutional kernels, c is a channel index and n denotes an index of the one of the original convolutional kernels or the one of the complementary sparse convolutional kernels.

17. The computer program product of claim 16, wherein the program instructions are further executable by the processor to cause the processor to:
determine the original convolutional kernels and the sparse kernels to replace the original convolutional kernels based on weight data, and wherein the size of the one of the original convolutional kernels or the one of the complementary sparse convolutional kernels is 3×3, $W_{even}$ is chosen to be a cross (x) shape and $W_{odd}$ is a plus sign (+) shape.

18. The computer program product of claim 16, wherein the program instructions are further executable by the processor to cause the processor to:
determine the original convolutional kernels and the sparse kernels to replace the original convolutional kernels based on similarity data.

19. The computer program product of claim 16, wherein the program instructions are further executable by the processor to cause the processor to:
tune a convolutional neural network model based on the complementary sparse convolutional kernels in the convolutional layers.

20. The computer program product of claim 16, wherein the program instructions are further executable by the processor to cause the processor to:
train a convolutional neural network model based on the complementary sparse convolutional kernels in the convolutional layers.

* * * * *